United States Patent [19]

Fuchs et al.

[11] Patent Number: 5,664,318
[45] Date of Patent: Sep. 9, 1997

[54] PROCESS AND ARRANGEMENT FOR DETERMINING REFERENCE POSITIONS FOR PLANAR HYBRID STEPPER MOTORS

[75] Inventors: Carl-Friedrich Fuchs; Ronald Krippendorf; Juergen Loebel, all of Jena; Nico Correns, Weimar, all of Germany

[73] Assignee: Carl Zeiss Jena GmbH, Jena, Germany

[21] Appl. No.: 377,651

[22] Filed: Jan. 25, 1995

[30] Foreign Application Priority Data

Jan. 27, 1994 [DE] Germany .................... 44 02 384.7

[51] Int. Cl.⁶ ............................................. H02K 15/00
[52] U.S. Cl. ........................... 29/596; 29/593; 310/12
[58] Field of Search ................... 29/593, 596; 310/156, 310/269, 12, 13

[56] References Cited

U.S. PATENT DOCUMENTS

| | | | |
|---|---|---|---|
| 4,958,115 | 9/1990 | Miller | 310/13 X |
| 5,023,496 | 6/1991 | Niikura | 310/12 |
| 5,412,265 | 5/1995 | Sickafus | 310/40 MM |

FOREIGN PATENT DOCUMENTS 43 00 197  7/1994  Germany .

OTHER PUBLICATIONS

Brochure: "PASIM—Effective Automation by Parallel Drive Systems", by PASIM Antriebstechnik GmbH.

*Primary Examiner*—S. Thomas Hughes
*Attorney, Agent, or Firm*—McAulay Fisher Nissen Goldberg & Kiel, LLP

[57] ABSTRACT

A process and an arrangement are described for determining reference positions for planar hybrid stepper motors having a stator which is provided with a structure and a rotor which is supported thereon in air bearings. The process includes the following steps: The rotor is set down on the stator and the air supply for the air bearing is switched on. The rotor is brought into an alignment position in a working connection with at least two defined, stationary mechanical stops or with displacement-free electrical contacts manually or by mechanical or electrical auxiliary device or in a self-propelled manner. The air supply for the air bearing is then turned off in order to fix the rotor in this alignment position and the rotor is then so supplied with current in sequence in a defined manner and the air supply to the air bearings switched on in such a way that the rotor is brought from the alignment position into a reference position which is aligned with respect to the stator structure.

7 Claims, 2 Drawing Sheets

PROCESS AND ARRANGEMENT FOR DETERMINING REFERENCE POSITIONS FOR PLANAR HYBRID STEPPER MOTORS

BACKGROUND OF THE INVENTION a) Field of the Invention

The invention is directed to a process and an arrangement for determining reference positions for planar hybrid stepper motors. Hybrid stepper motors of this type are used especially in coordinate measuring devices and in machinery in which measuring tables or machine tables are to be moved in multiple coordinates.

b) Description of the Related Art

Such drive systems for tables are known from the publication "PASIM—direct drives—effective automation through parallel drive systems" by PASIM Antriebstechnik GmbH., Suhl, Germany, and enable highly accurate positioning and high displacement resolution at high speed and acceleration in the coordinates of the plane using hybrid stepper motors, known per se. Extensively wear-resistant and maintenance-free operation is achieved by using integrated air bearings. These systems are provided with a base plate serving as a stator, preferably with a soft-iron or soft-magnetic ceramic plate (DE 4300197) arranged thereon, and a rotor which is formed by a support plate having a soft-iron base body and controllable permanent electromagnets. The soft-iron plate or soft-magnetic ceramic plate is provided with a closely spaced grid of intersecting grooves on its surface. The surface of the rotor facing the stator advantageously has nozzles which are connected with an air supply unit providing for air bearing support.

In order to achieve high development of power and accuracy of movement and positioning, such hybrid stepper motors require faultless alignment of the structure of the rotor to the structure of the stator. Incorrect alignment of the structure of the rotor to the structure of the stator in planar hybrid stepper motors leads to impaired operation. For example, if angular deviations which may not exceed a certain magnitude should occur between the aforementioned structures, the stepper motor will remain capable of movement but will have low power development and poor accuracy in the movement of the rotor. But if these angular deviations exceed a certain limiting value, there will be no movement of the rotor. In hybrid stepper motors which operate by increments, the incremental step for a position is counted starting from a reference position or reference point. Because of the incremental operation of the stepper motor, it is necessary, in order to ensure perfect operation, to check the angular position of the rotor with reference to the stator and the correct reference point or reference position, in particular when starting or after problems occur. Previously, the alignment of the rotor relative to the stator and its adjustment to the reference point or reference position was effected manually or mechanically accompanied by visual inspection so that inaccuracies and, accordingly, faulty operation of the hybrid stepper motor could not be eliminated.

OBJECT AND SUMMARY OF THE INVENTION

Therefore, the present invention has, as a primary object, the providing of a process and an arrangement for determining the reference position for planar hybrid stepper motors by means of which the rotor of the stepper motor can be moved to or can occupy an alignment position or reference point or reference position in an objective manner so as to be reproducible at any time without the subjective influence of the user in a simple manner and at low technical cost.

This object is met according to the invention by a process for determining reference positions for planar hybrid stepper motors having a stator which is provided with a structure of orthogonally extending grooves and a movable part such as a rotor which has coils and is supported on the stator in air bearings, comprising the steps of setting the movable part down on the stator and switching on the air supply for the air bearing, bringing the movable part into an alignment position in a working connection with at least two defined, stationary mechanical stops or with displacement-free electrical contacts or switching devices manually or by mechanical or electrical auxiliary means or by its own propulsive energy, turning off the air supply for the air bearing for the purpose of fixing the movable part in the alignment position, and supplying the coils of the movable part with current in a defined manner in sequence and switching on the air supply to the air bearings so that the movable part is brought from the alignment position into a reference position which is aligned with respect to the stator structure. Arrangements for carrying out the process are also encompassed within the scope of the invention.

An arrangement for carrying out the process includes, among others, a mechanically or electrically actuated catching device and stops which are preferably arranged so as to be fixed at the stator of the hybrid stepper motor. This catching device has means, e.g., a gripper arm, which is connected with at least one coupling member arranged at the movable part so that the movable part, which is supplied with air but not with current, can be moved into the desired, exactly reproducible alignment position at the stops. These stops are preferably constructed as switching elements operating in a displacement-free manner (e.g., electrical contacts) and are logically connected as AND elements so that an electrical signal will be applied to the control device or control unit only when all of the switching elements produce a signal. This signal represents detection of the alignment position, since the movable part contacts all of the stops at the same time only in the aligned position. When the alignment position is detected, the air supply for the air bearing is interrupted momentarily by the control device so that the movable part sets down on the stator and retains its currently selected position. In this retained alignment position, the coils of the movable part are then provided with current in a defined manner in such a way that when the air supply to the air bearings is switched on the movable part arrives, by means of a first movement of its own, in a reference position which is preferably located in the vicinity of the alignment position and in which the movable part is aligned in a precise manner with respect to the orthogonally arranged structures of the stator. Proceeding from this reference position, the incremental steps in the movement of the movable part on the stator are counted in two coordinates and, in this way, the respective position of the movable part is defined with great precision.

According to another arrangement, wedge-shaped members which engage with one another during the movement of the movable part are arranged at the stator and movable part. The wedge surface of the member located on the movable part slides along a wedge surface of the member fastened to the stator until the defined alignment position of the movable part is reached. One of the advantages of this arrangement consists in that angular errors of the movable part with respect to the structure of the stator are also eliminated in that the movable part is automatically aligned with the stator structure. Electrical switching means can also be provided at the stator or at the movable part to indicate that the initial position or reference position of the movable part has been reached. These switching means then produce signals which are transmitted to the control unit and switch off the current supply to the movable part and the air supply for the air bearings. The two wedge-shaped members are then disengaged, the coils of the movable part are excited and the air supply to the air bearings is turned on. The movable part now arrives in the reference position and is then aligned with respect to the structure of the stator. In order to prevent jolts, the wedge-shaped members are advantageously provided with their own shock absorbing means.

According to another embodiment form of the arrangement, at least two sensors are arranged at the movable part and can preferably be brought into a working connection with stops arranged on the stator. These sensors generate a signal when the alignment position is passed or reached, i.e. when all AND-connected sensors or other switching devices are actuated, and send this signal to the control unit controlling the movable part so that the movable part is stopped in this alignment position by switching off the current to the coils of the movable part and the air supply to the air bearings. When current is again applied to the coils and the air supply is subsequently switched on, the movable part arrives in the reference position.

As a result of the process and the arrangement according to the invention, a highly precise adjustment of the movable part with respect to alignment and reference position is achieved manually as well as automatically in such a way that it can easily be reproduced at any time without subjective influence on the part of the user and accordingly enables trouble-free, precise operation of the hybrid stepper motor.

The invention will be explained in the following with reference to an embodiment example.

DESCRIPTION OF THE PREFERRED EMBODIMENTS

Figure 1:
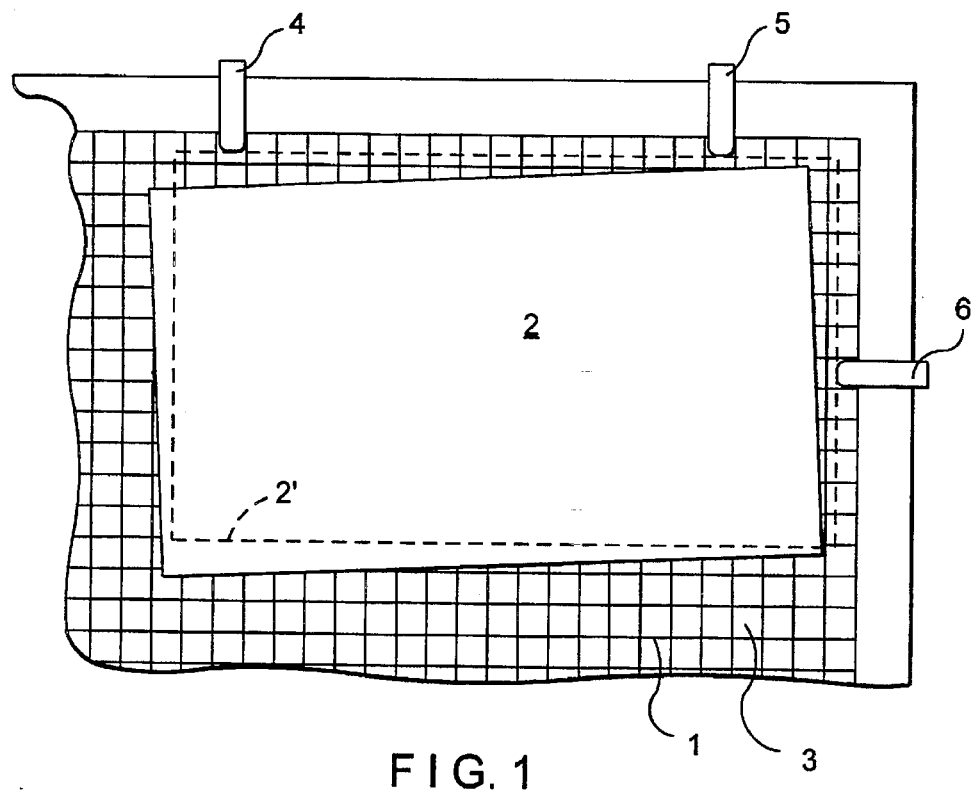
FIG. 1 shows a schematic view of a stepper motor with stator and rotor (movable part)
Figure 2:
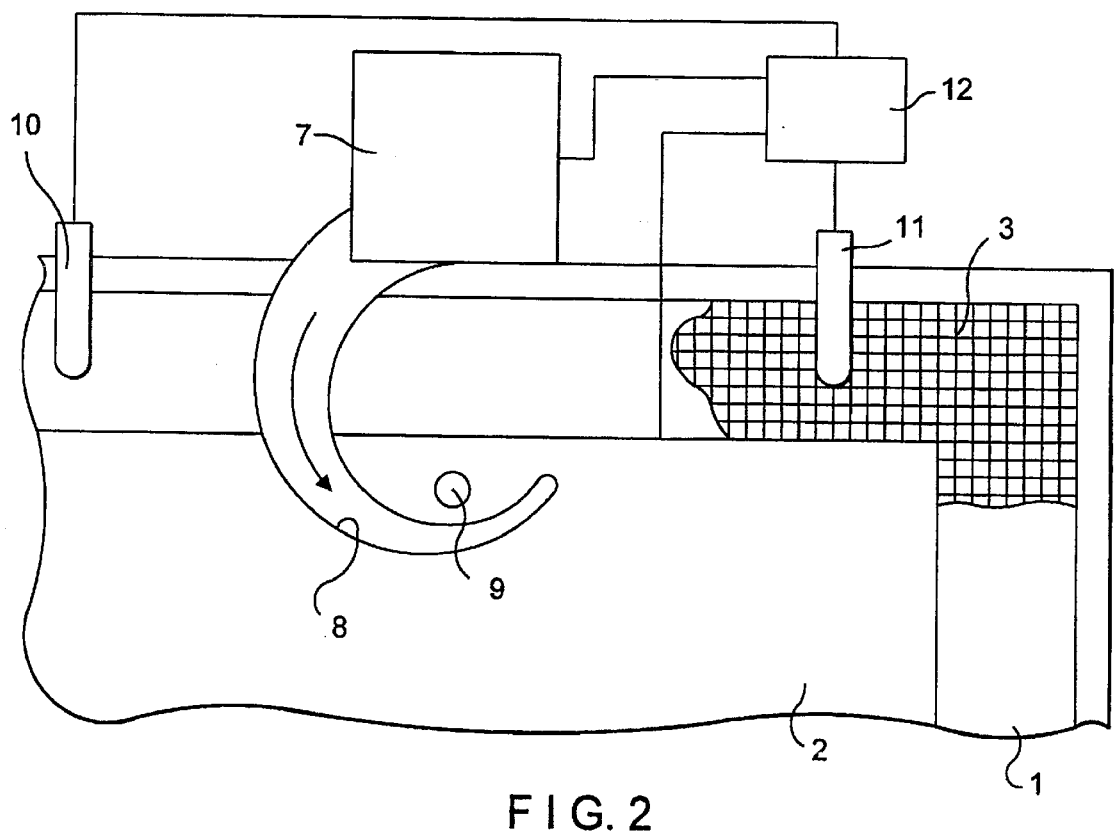
FIG. 2 shows an arrangement, according to the invention, with catching device.

The hybrid stepper motor shown in a highly schematic manner in FIG. 1 has a stator 1 and a movable part or rotor 2 which is supported on the latter in air bearings, not shown, so as to be movable in coordinates X and Y. The stator 1 is advantageously produced from soft-magnetic material, e.g., soft iron or soft-magnetic ceramic, and is provided at its surface facing the movable part 2 with a structure in the form of orthogonally intersecting grooves 3 extending parallel to coordinates X and Y. When the stepper motor is put into operation, the movable part 2 is set down upon the stator 1 in a roughly aligned manner, i.e., usually with an angular deviation relative to the orientation of the grooves 3, and the air supply for the air bearing is switched on. The movable part 2 is then brought into contact with at least two AND-connected stops 4; 5; 6 manually or by mechanical or electrical auxiliary means or by means of its own propulsive energy. These stops 4; 5; 6 are preferably arranged on the stator 1 in a stationary manner and are preferably constructed as displacement-free electrical contacts or switching devices. As is shown in FIG. 2, a mechanically or electrically operated catching device 7 with a swivelable gripper arm 8 is provided as mechanical or electrical auxiliary means and is advantageously arranged at the stator 1. After the movable part 2 has been brought into contact with the stops 4; 5; 6 in an alignment position, the air supply to the air bearings is switched off for the purpose of fixing the movable part 2 in position and the coils (not shown) of the movable part 2 are supplied with current in sequence and the air supply to the air bearings of the movable part 2 is switched on again. The movable part 2 is now situated in its reference position in which it occupies an aligned position—the reference position—with respect to the grooves 3 of the stator 1 by moving clear of the stops in a first self-movement. The stepper motor is accordingly fully operational. The position of the aligned part 2 is shown in dashed lines in FIG. 1 and is designated by 2'.

In the arrangement according to the invention shown in FIG. 2, the catching device 7 is arranged at the stator 1 and preferably has means in the form of a swivelable gripper arm 8 which can engage with at least one coupling member 9 attached to the movable part 2 so that when the gripper arm 8 swivels in the direction of the arrow, the movable part 2 is brought into contact with stops or electrical switching devices 10, 11 provided at the stator 1 in an exactly defined alignment position. The switching devices 10 and 11, catching device 7 and rotor 2 of the hybrid stepper motor are connected with a controlling unit 12 which controls the coils of the movable part 2, the switching devices 10 and 11 and the catching device 7. When the movable part 2 occupies the alignment position, the gripper arm 8 is swiveled back, the air supply to the air bearings is interrupted and the movable part 2 is accordingly fixed in this position. Then, as was already described above, the movable part 2 is supplied with current again and the air supply is switched on so that the movable part can arrive in the reference position. The stepper motor is operational.

Figure 3:
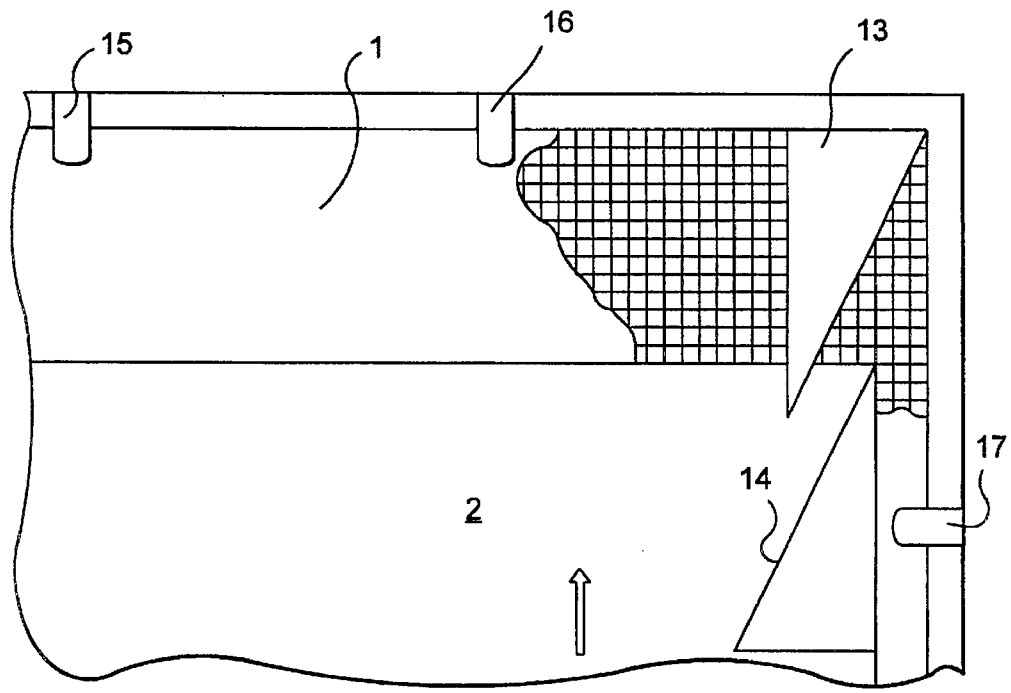
FIG. 3 shows an arrangement with wedge-shaped members.

In the arrangement according to FIG. 3, a wedge-shaped structural member 13; 14 is provided, in each instance, at the stator 1 and at the movable part 2. These structural members 13 and 14 are brought into a working connection with one another when the movable part 2 moves in the direction of the sensors or AND-connected switching devices 15; 16 and 17 arranged at the stator 1 and move the movable part 2 into the defined alignment position. When the alignment position is reached, the switching devices 15; 16; 17 deliver signals to the controlling unit (not shown in FIG. 3) which stops further movement of the movable part 2. Due to the cooperation of the wedge-shaped structural members 13 and 14, any angular deviations of the movable part 2 with respect to the orientation of the grooves 3 on the stator 1 are also corrected by means of the rotation of the movable part 2 around a Z axis vertical to the X–Y plane. The wedge-shaped structural members 13 and 14 can be provided with shock absorbers in order to prevent possible shocks.

Figure 4:
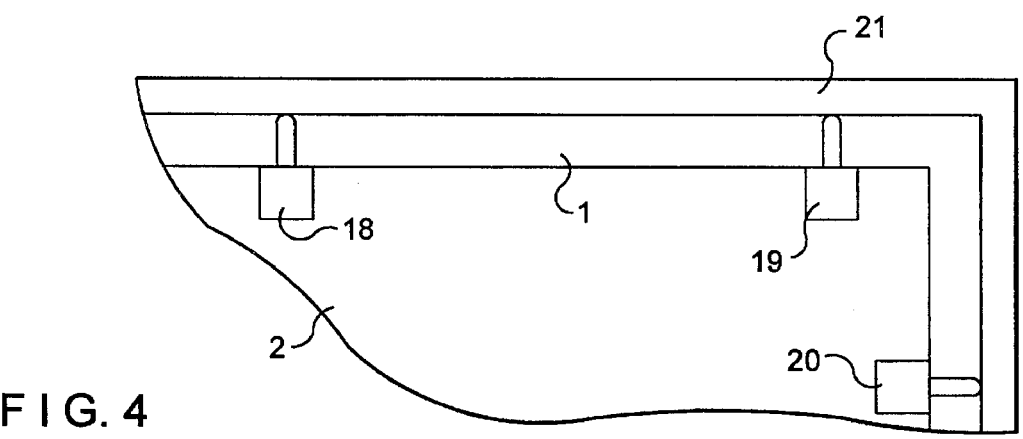
FIGS. 4 and 5 show arrangements with sensors.
Figure 5:
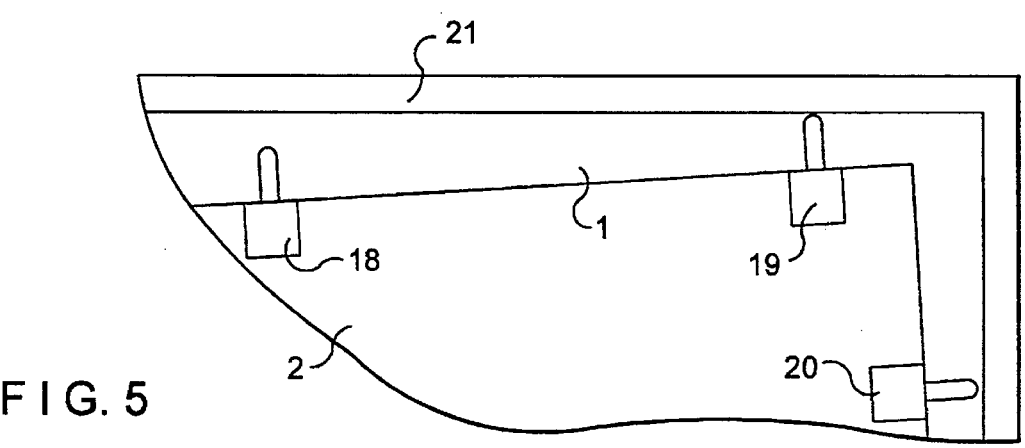

In an arrangement according to FIGS. 4, 5 and 6, at least two sensors 18; 19; 20 are provided at the movable part 2 and, during the alignment process, are brought into contact with stops arranged at the stator 1 or with a tape or strip 21 provided at the stator 1. These sensors 18; 19; 20 are not switching elements operating in a displacement-free manner. They send a switching signal to the controlling unit only when their switching member is situated in a preferably adjustable position, this switching member being movable within a range of displacement. When the movable part 2 which is seated upon the stator 1 at an angular deviation moves in the direction of the strip 21 by its own driving movement, the individual sensors 18; 19; 20 generally contact the stops of the stator 1 one after the other and, as a result of the control signals sent to the controlling unit by the sensors, the continued movement of the movable part 2 is controlled by appropriate actuation of the coils of the movable part 2 until the movable part 2 reaches the alignment position (FIG. 4). The movable part 2 is then stopped in this position and, after the air supply for the air bearings is switched on and current is restored to the coils of the movable part 2, the stepper motor can occupy the reference position in which it is also aligned with the orthogonally extending grooves of the stator 1. The stepper motor is accordingly operational.

While the foregoing description and drawings represent the preferred embodiments of the present invention, it will be obvious to those skilled in the art that various changes and modifications may be made therein without departing from the true spirit and scope of the present invention.

What is claimed is:

1. A process for determining reference positions for planar hybrid stepper motors having a stator which is provided with a structure of orthogonally extending grooves and a movable part which has coils and is supported on the stator in air bearings, comprising the steps of:

setting the movable part down on the stator and switching on an air supply for the air bearings;

bringing the movable part into an alignment position in a working connection with at least two defined, stationary mechanical stops;

turning off the air supply for the air bearings, thereby fixing the movable part in said alignment position; and supplying the coils of the movable part with current in sequence and switching on the air supply to the air bearings so that the movable part is brought from the alignment position into a reference position which is aligned with respect to the stator structure.

2. A process for determining reference positions for planar hybrid stepper motors having a stator which is provided with a structure of orthogonally extending grooves and a movable part which has coils and is supported on the stator in air bearings, comprising the steps of:

setting the movable part down on the stator and switching on an air supply for the air bearings;

bringing the movable part into an alignment position in a working connection with displacement-free electrical contacts;

turning off the air supply for the air bearings, thereby fixing the movable part in said alignment position; and supplying the coils of the movable part with current in sequence and switching on the air supply to the air bearings so that the movable part is brought from the alignment position into a reference position which is aligned with respect to the stator structure.

3. A process for determining reference positions for planar hybrid stepper motors having a stator which is provided with a structure of orthogonally extending grooves and a movable part which has coils and is supported on the stator in air bearings, comprising the steps of:

setting the movable part down on the stator and switching on an air supply for the air bearings;

bringing the movable part into an alignment position in a working connection with switching devices manually;

turning off the air supply for the air bearings, thereby fixing the movable part in said alignment position; and supplying the coils of the movable part with current in sequence and switching on the air supply to the air bearings so that the movable part is brought from the alignment position into a reference position which is aligned with respect to the stator structure.

4. A process for determining reference positions for planar hybrid stepper motors having a stator which is provided with a structure of orthogonally extending grooves and a movable part which has coils and is supported on the stator in air bearings, comprising the steps of:

setting the movable part down on the stator and switching on an air supply for the air bearings;

bringing the movable part into an alignment position in a working connection by mechanical or electrical auxiliary means;

turning off the air supply for the air bearings, thereby fixing the movable part in said alignment position; and supplying the coils of the movable part with current in sequence and switching on the air supply to the air bearings so that the movable part is brought from the alignment position into a reference position which is aligned with respect to the stator structure.

5. A process as defined in claim 4 wherein said auxiliary means includes at least two defined stationary mechanical stops.

6. A process as defined in claim 4 wherein said auxiliary means includes at least two displacement-free electrical contacts.

7. A process as defined in claim 4 wherein said auxiliary means includes at least two switching devices.

* * * * *